US010294860B2

(12) United States Patent
Goto

(10) Patent No.: US 10,294,860 B2

(45) Date of Patent: May 21, 2019

(54) RESIN COVER REMOVAL STRUCTURE AND RESIN COVER

(71) Applicant: TOYOTA BOSHOKU KABUSHIKI KAISHA, Aichi-ken (JP)

(72) Inventor: Tatsuya Goto, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/876,761

(22) Filed: Jan. 22, 2018

(65) Prior Publication Data

US 2018/0245511 A1 Aug. 30, 2018

(30) Foreign Application Priority Data

Feb. 24, 2017 (JP) ................................ 2017-034054

(51) Int. Cl.

*F02B 77/08* (2006.01)
*F02F 7/00* (2006.01)
*B60R 11/00* (2006.01)

(52) U.S. Cl.

CPC ............ *F02B 77/083* (2013.01); *F02F 7/006* (2013.01); *F02F 7/0073* (2013.01); *B60R 2011/0038* (2013.01); *F02F 2007/0078* (2013.01); *F05C 2253/20* (2013.01)

(58) Field of Classification Search

CPC . F02B 77/083; F02F 7/006; B60R 2011/0038
See application file for complete search history.

(56) References Cited

U.S. PATENT DOCUMENTS

2006/0288672 A1* 12/2006 Miyake .............. B01D 46/0005
55/385.3

FOREIGN PATENT DOCUMENTS

JP H05-001637 Y 1/1993

OTHER PUBLICATIONS

Blake, Dave. "How to Take off Engine Cover of 2007 VW Rabbit & Put Back on by Ace Mechanic." YouTube, YouTube, Jul. 1, 2014, www.youtube.com/watch?v=MLORiWz4ELE (Year: 2014).*

* cited by examiner

*Primary Examiner* — Kevin A Lathers

(74) *Attorney, Agent, or Firm* — Greenblum & Bernstein, P.L.C.

(57) ABSTRACT

Provided is a resin cover removal structure for removing a resin cover attached to a metallic body, where the body and the resin cover are attached to each other in such a manner that a body-side attachment surface formed on a peripheral edge portion of the body and a cover-side attachment surface formed on a peripheral edge portion of the resin cover face each other, a part of at least one of the body-side attachment surface and the cover-side attachment surface is cut off to provide an insertion groove opened outside a peripheral edge portion thereof, the insertion groove is inclined in such a manner that a distance between the body and the resin cover decreases toward the inside of the peripheral edge portion, and the resin cover can be removed from the body by inserting a wedge-shaped tool into the insertion groove.

10 Claims, 4 Drawing Sheets

RESIN COVER REMOVAL STRUCTURE AND RESIN COVER

INCORPORATION BY REFERENCE

The present application claims priority from Japanese Patent Application No. 2017-34054 filed on Feb. 24, 2017, based on US Patent Law § 119, the disclosure of which is expressly incorporated herein by reference in its entirety.

BACKGROUND

1. Technical Field

The present invention relates to a resin cover removal structure and a resin cover. Specifically, the present invention relates to a resin cover removal structure that makes it possible to easily remove a resin cover attached to a metallic body, and a resin cover having the removal structure.

2. Related Art

There are many cases where a synthetic resin cover is attached to a part of a metallic body. For example, when the body is an engine of a vehicle, the engine body has a portion covered with a cover such as a cylinder head cover or a chain cover. The engine body is roughly divided into three components: a cylinder head, a cylinder block and a crankcase in the descending order in a piston movement direction. The cylinder head cover normally covers the upper surface of the cylinder head: The chain cover is provided so as to cover a chain bridged from a crankshaft of the crankcase to a camshaft of the cylinder head on a side surface of the engine body. In addition, the engine body has a portion to which a component such as an intake manifold or the like is similarly attached. In a portion where such a cover etc. is attached, normally the cover etc. is brought into close contact with the engine body with a gasket interposed therebetween, and is fixed by bolting.

When engine maintenance etc. is performed, it is necessary to remove the cover etc. However, a sealing material (gasket) is interposed between mating surfaces of the engine body and the cover etc., and the engine body and the cover etc. are normally firmly fixed together. Therefore, in removal of the cover etc., a bolt fastening the engine body and the cover etc. is removed, a flat tool such as a spatula is then inserted in a gap between the engine body and the cover etc, so that the cover etc. which is in close contact with the engine body with a gasket interposed therebetween is peeled off and removed from the engine body. However, a resin has come into use as a material of the cover etc., and it is necessary to prevent deformation and damage in removal from the engine body.

An attachment structure is known in which, for making it possible to easily remove an engine cover without damaging mating surfaces of the engine cover and an engine body, a special ring member is engaged with a shaft portion of a bolt for attaching a cylinder head cover to the engine body, so that the cover which is in close contact with the engine body is removed by lifting the cover as the bolt rises when the bolt is loosened (see, for example, Japanese Utility Model Publication No. 05-001637).

As described above, normally the engine body and the cover etc. are firmly fixed to each other with a sealing material interposed therebetween. Conventionally, in removal of the cover etc. from the engine body, a tool is inserted into a gap between mating surfaces thereof, so that the cover which is in close contact with the engine body is peeled off and removed from the engine body. However, there is a problem that during peeling operation, the mating surfaces of the cover and the engine body are often heavily wrenched by a tool, so that the cover is scratched. In particular, when the cover etc. is made of resin, the cover is easily damaged or deformed when removed.

An attachment structure as shown in Japanese Utility Model Publication No. 05-001637 has a problem that the cost increases because a separate ring-shaped member is used. For inserting the separate ring-shaped member, it is necessary to provide a gap in a portion where the separate ring-shaped member is interposed, and the separate ring-shaped member is required to have a strong force for lifting the cover as a bolt rises. Since the separate ring-shaped member is freely rotatable with respect to the bolt, noises may be caused by the separate ring-shaped member or the separate ring-shaped member may be detached by vibrations during operation of the engine, resulting in damage to the engine. Further, at the time of attaching the cover to the engine again or replacing the bolt, it is necessary to remove the separate ring-shaped member from the bolt, and when there are a large number of bolts for attaching the cover, enormous time and effort are required.

In particular, the chain cover is provided so as to cover a chain bridged from a crankshaft of a crankcase to a camshaft of a cylinder head as described above. Therefore, the chain cover is required to provide a seal across three components (cylinder head, cylinder block and crankcase) that make up the engine body. Thus, the chain cover is firmly fixed so as to secure sealing property even when there is a slight level difference between components, and it is difficult to remove the chain cover. Further, in the case of a V-type engine, a horizontally opposed engine or the like, the cylinder block and the cylinder head are branched, and therefore the chain cover for covering the side surface is inevitably enlarged, so that it is further difficult to remove the chain cover.

SUMMARY

Embodiments of the present invention have been made in view of the above-described situation, and an object of the present invention is to provide a resin cover removal structure that makes it possible to easily remove a resin cover attached to a metallic body of an engine or the like, and a resin cover having the removal structure.

An embodiment is a resin cover removal structure for removing a resin cover attached to a metallic body, where the body and the resin cover are attached to each other in such a manner that a body-side attachment surface formed on a peripheral edge portion of the body and a cover-side attachment surface formed on a peripheral edge portion of the resin cover face each other, a part of at least one of the body-side attachment surface and the cover-side attachment surface is cut off to provide an insertion groove opened outside a peripheral edge portion thereof, the insertion groove is inclined in such a manner that a distance between the body and the resin cover decreases toward the inside of the peripheral edge portion, and the resin cover is separated from the body by inserting a wedge-shaped tool into the insertion groove.

In another embodiment, the tool is thinned toward a tip at an inclination angle equal to or greater than the inclination of the insertion groove, and the tool is inserted into the insertion groove in a direction parallel to the body-side attachment surface to remove the resin cover from the body.

In another embodiment, the insertion groove is provided on the cover-side attachment surface.

In another embodiment, a gasket is provided on the interior tide from the insertion groove.

In another embodiment, the body is an engine, and the resin cover is a cylinder head cover or a chain cover.

The resin cover according to the embodiment includes the insertion groove.

The resin cover removal structure according to the embodiment is a resin cover removal structure for removing a resin cover attached to a metallic body, where the body and the resin cover are attached to each other in such a manner that a body-side attachment surface formed on a peripheral edge portion of the body and a cover-side attachment surface formed on a peripheral edge portion of the resin cover face each other, a part of at least one of the body-side attachment surface and the cover-side attachment surface is cut off to provide an insertion groove opened outside a peripheral edge portion thereof, the insertion groove is inclined in such a manner that a distance between the body and the resin cover decreases toward the inside of the peripheral edge portion, and the resin cover can be removed from the body by inserting a wedge-shaped tool into the insertion groove. Thus, a resin cover attached to a metallic body of an engine etc. can be removed without using a separate member, and generation of noises by vibrations and detachment of a member do not occur. In particular, even a resin chain cover which is firmly fixed to a plurality of components that form an engine etc. can be easily removed. In addition, in conformity with the position of the insertion groove, a tool having a wedge shape at a tip portion, such as a spatula or a driver, is inserted into the insertion groove toward the interior in a direction substantially parallel to the mating surfaces of the metallic body and the resin cover, and thus the tool serves as a wedge, so that a force can be applied in a direction along which the body and the resin cover are separated from each other. Therefore, in removal of the resin cover from the body for maintenance or the like, the mating surfaces of the cover and the body are not wrenched by the tool, and thus damage and deformation of the resin cover can be prevented.

The tool is thinned toward a tip at an inclination angle equal to or greater than the inclination of the insertion groove, and when the tool is inserted into the insertion groove in a direction parallel to the body-side attachment surface to separate the resin cover from the body, the tool can be made to act as an effective wedge to easily separate the body and the resin cover from each other.

When the insertion groove is provided on the cover-side attachment surface, only the resin cover may be provided with the insertion groove, and it is not necessary to change the shape and structure of the body of an engine etc.

When a gasket is provided on the interior side from the insertion groove, insertion of a tool to be used for removal is restricted by the interior wall surface of the insertion groove, so that the tool does not reach the gasket. Accordingly, there is no risk of scratching the mating faces of the resin cover, the gasket and the body, and even when attachment is performed again, deterioration of sealing property can be prevented.

When the body is an engine, and the resin cover is a cylinder head cover or a chain cover, removal of the cylinder head cover or chain cover from the engine can be facilitated only by providing the insertion groove.

According to the resin cover of the embodiment, the insertion groove is provided, and therefore a resin cover which is easily removed in maintenance can be provided.

BRIEF DESCRIPTION OF DRAWINGS

The present invention will be described further in detail in the following detailed descriptions by way of non-limiting examples of exemplary embodiments according to the present invention and with reference to a plurality of drawings mentioned below, where like reference symbols denote like components through some views in the drawings.

DETAILED DESCRIPTION

The matters presented herein are illustrative, intended to illustratively describe embodiments of the present invention, and intended to provide explanations considered to allow the principles and conceptual features of the present invention to be understood most effectively and without difficulty. In this respect, the matters presented herein are not intended to present the structural details of the present invention to an extent more than necessary for fundamentally understanding the present invention, and are intended to make it evident to those skilled in the art how some modes of the present invention are actually implemented by means of explanations along with the drawings.

A resin cover removal structure according to an embodiment is a structure for removing a resin cover (1) attached to a metallic body (6). The configurations, structures, uses and the like of the metallic body (6) and the resin cover (1) are not particularly limited. For example, the metallic body (6) may be an engine body, and the resin cover (I) may be a cylinder head cover, a chain cover or the like that are made of synthetic resin.

Figure 1:
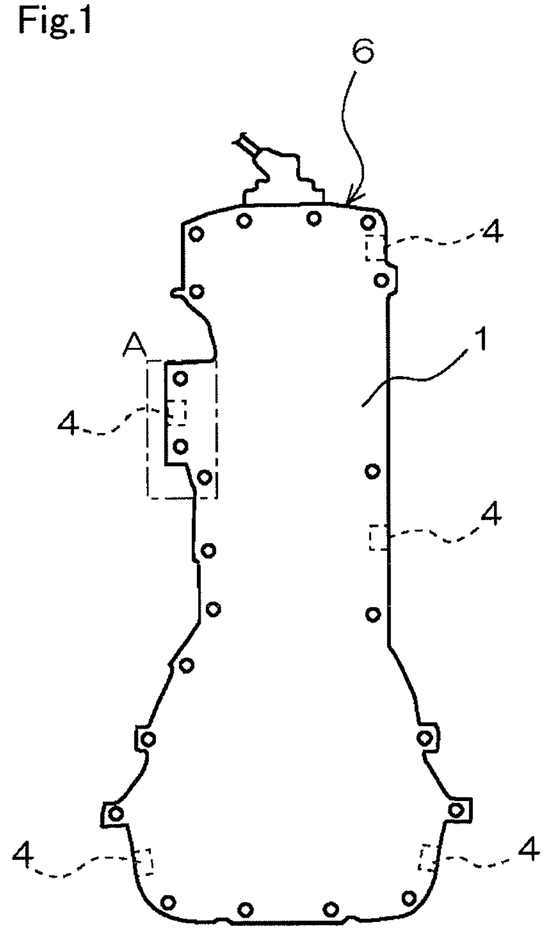
FIG. 1 is a front view showing an external appearance of a resin cover attached to an engine body.

FIG. 1 shows a schematic external appearance as seen from the resin cover 1 side for a state in which the resin cover (chain cover) 1 is attached to the engine body 6. A mating surface (body-side attachment surface) 61 with the resin cover 1 is formed on a peripheral edge portion of the engine body 6, which faces the resin cover 1, and a mating surface (cover-side attachment surface) 11 with the engine body 6, which corresponds to the body-side attachment surface 61, is formed on a peripheral edge portion of the resin cover 1. The resin cover 1 is attached to the engine body 6 with a bolt or the like at an appropriate position in such a manner that the body-side attachment surface 61 and the cover-side attachment surface 11 face each other. A sealing material (gasket) 7 for hermetically sealing the inside of the engine body 6 is provided on the mating surfaces of the resin cover 1 (cover-side attachment surface 11) and the engine body 6 (body-side attachment surface 61).

The resin cover 1 shown in FIG. 1 is a chain cover provided on the engine body 6 to cover a chain (not shown) for transmitting rotations of the engine to a cam shaft. A peripheral edge portion of the resin cover 1 is provided with five insertion grooves 4 (see FIGS. 2 and 3).

A part of at least one of the body-side attachment surface 61 and the cover-side attachment surface 11 is cut off to provide the insertion groove 4 opened outside the peripheral edge portion (outside the mating surfaces of the resin cover 1 and the engine body 6). The insertion groove 4 is formed with a predetermined depth from the opening of the peripheral edge portion. The number of the insertion grooves 4 and the positions where the insertion grooves 4 are provided can be appropriately set. The size of the insertion groove 4 is not particularly limited as long as it is possible to insert a tool to be used for removing the resin cover 1.

Figure 2:
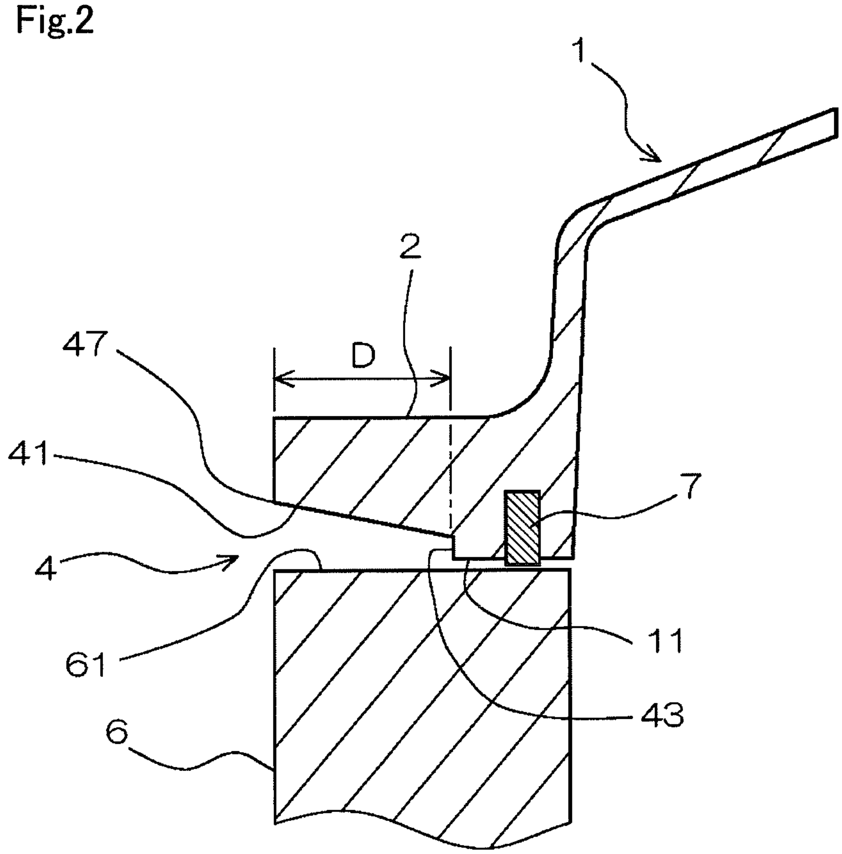
FIG. 2 is a partial sectional view showing an insertion groove portion formed on mating surfaces of an engine body and a resin cover.

FIG. 2 shows a cross-sectional shape of the insertion groove 4 provided on a surface (cover-side attachment surface 11) facing the engine body 6 in the peripheral edge portion (flange portion) 2 of the resin cover 1. The insertion groove 4 is formed in a part of the cover-side attachment surface 11 provided on the flange portion 2 of the resin cover 1. In FIG. 2, the insertion groove 4 is formed on the resin cover 1 (cover-side attachment surface 11) side, but the insertion groove 4 may be formed on the engine body 6 (body-side attachment surface 61) side, or formed on both the sides. The insertion groove 4 in this example extends to an interior wall surface 43 along the mating surfaces from an opening portion 47 opened outside (depth D). A top surface 41 of the insertion groove 4 is provided so as to be inclined with respect to the mating surface (the body-side attachment surface 61) in such a manner that the distance between the engine body 6 and the resin cover 1 decreases from the opening portion toward the interior.

On the inside (interior side) from the interior wall surface 43 of the insertion groove 4 at the flange portion 2 of the resin cover 1, the cover-side attachment surface 11 of the resin cover 1 is not cut off but is left to be in contact with the body-side attachment surface 61 of the engine body 6. Specifically, a gasket 7 is interposed between the cover-side attachment surface 11, which is thus left, and the body-side attachment surface 61. By the gasket 7, the inside of the engine body 6 can be hermetically sealed against the outside. Therefore, the depth D of the insertion groove 4 may be within a range which ensures that the gasket 7 can be disposed on the cover-side attachment surface 11 left on the interior side of the insertion groove 4. In FIG. 2, the gasket 7 is disposed in a groove provided on the cover-side attachment surface 11.

Figure 3:
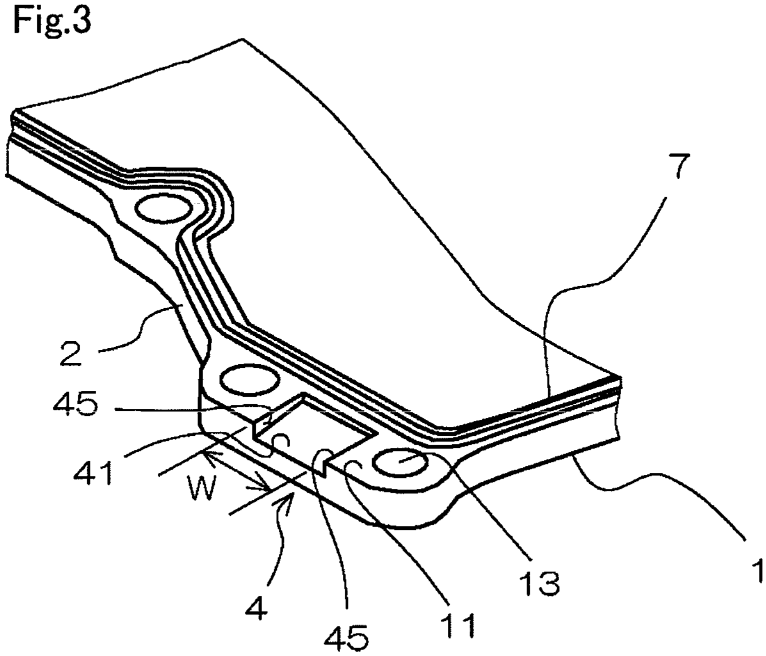
FIG. 3 is a partially enlarged perspective view showing an insertion groove portion provided on a resin cover.

FIG. 3 is a perspective view of the insertion groove 4 formed on the flange portion 2 of the resin cover 1 as seen from the engine body 6 side. The length between both side wall surfaces 45 of the insertion groove 4, i.e. the width W of the insertion groove 4, is not particularly limited, and may be determined according to the width of a tool to be used for removing the resin cover 1. However, the insertion groove 4 may be opened at both sides. Providing the side wall surface 45 to make the width of the insertion groove 4 constant facilitates positioning of the tool and hence prevents detachment of the tool from the insertion groove 4.

In this example, the resin cover 1 is attached to the engine body 6 with the gasket 7 sandwiched therebetween using a bolt, and a bolt hole 13 for this purpose is provided in the vicinity of the insertion groove 4.

Figure 4:
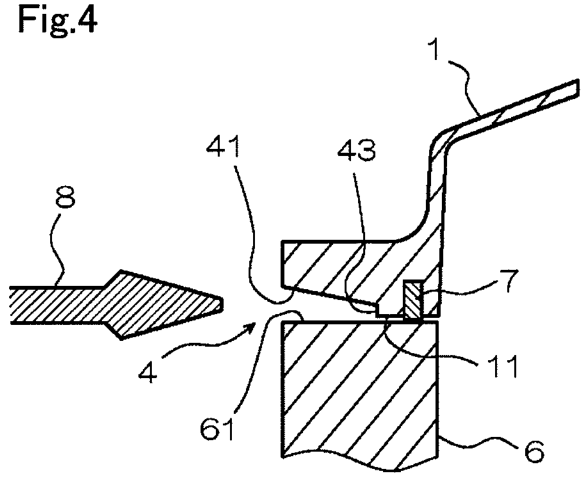
FIG. 4 is a partial sectional view showing an insertion groove provided on a resin cover, and a tool.

All bolts fastening the resin cover 1 and the engine body 6 are removed, and a wedge-shaped tool 8 that is tapered so as to reduce the thickness at a tip portion as shown in FIG. 4 is then inserted into each insertion groove 4 to separate and remove the resin cover 1 from the engine body 6. The type of the wedge-shaped tool 8 is not particularly limited as long as the tip thereof is smaller than the opening portion 47 of the insertion groove 4. As the tool 8, for example, a tool such as a spatula, a minus screwdriver or a plus screwdriver, or a dedicated tool with a tip portion formed into a wedge shape may be used. Preferably, the tool 8 is thinned toward the tip at an inclination angle equal to or greater than the inclination of the insertion groove 4.

Figure 5:
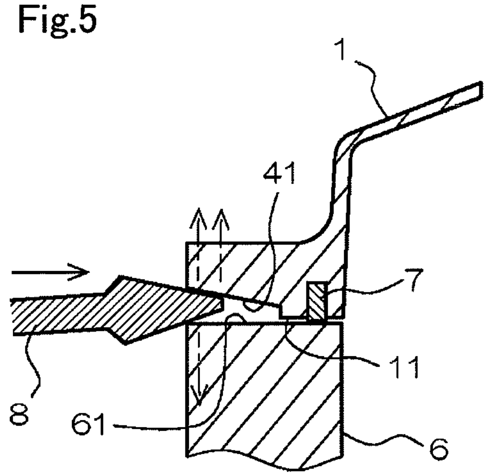
FIG. 5 is a partial sectional view showing a state in which a tool is inserted in an insertion groove provided on a resin cover.

When the wedge-shaped tool 8 described above is inserted toward the interior of the insertion groove 4 in a direction substantially parallel to the mating surface (body-side attachment surface 61) between the engine body 6 and the resin cover 1 as shown in FIG. 5, a force pressing the tool 8 in an axis direction acts in a direction perpendicular to the both mating surfaces (cover-side attachment surface 11 and body-side attachment surface 61). Accordingly, simply pressing the tool 8 toward the interior of the insertion groove 4 widens a gap between the resin cover 1 and the engine body 6 to peel off the gasket 7 which is in close contact with the body-side attachment surface 61, so that the resin cover 1 can be separated from the engine body 6 to remove the resin cover 1.

The inclination angle of the tip portion of the tool 8 may be larger than the inclination angle of the top surface 41 of the insertion groove 4. Accordingly, even though an operator does not perform a wrenching operation with the tool 8, the resin cover 1 and the engine body 6 can be easily separated from each other to remove the resin cover 1. It is preferable that the inclination angle of the tip portion of the tool 8 is substantially identical to the inclination angle of the top surface 41 of the insertion groove 4 as shown in FIG. 5. Accordingly, when the tool R is inserted in a direction substantially parallel to the mating surface (body-side attachment surface 61) between the engine body 6 and the resin cover 1, the outer surface of the tool 8 is in contact with the top surface 41 of the insertion groove 4 over a wide range, and thus a force pressing the tool 8 toward the interior of the insertion groove 4 effectively acts on the top surface 41 of the insertion groove 4, so that the resin cover 1 can be lifted.

Figure 6:
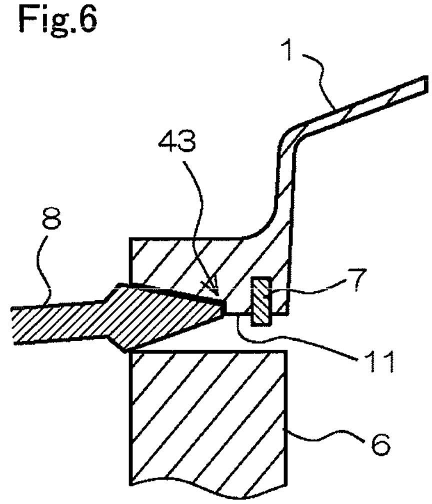
FIG. 6 is a partial sectional view showing a state in which a tool is inserted to an interior wall of an insertion groove provided on a resin cover.

It is preferable that the interior wall surface 43 perpendicular to the mating surface is provided in the insertion groove 4 to regulate insertion of the tool 8 as shown in FIG. 6. Accordingly, the interior wall surface 43 of the insertion groove 4 serves as a stopper for the tool 8, so that the cover-side attachment surface 11 and the gasket 7 on the interior side of the insertion groove 4 can be prevented from being scratched by the tool 8.

According to the removal structure for the resin cover 1 described above, removal of the resin cover 1 from the engine body 6 can be facilitated only by providing an appropriate number of insertion grooves 4 on the mating surface of the resin cover 1 which faces the engine body 6. Since a separate member is not used, generation of noises by vibrations etc. and detachment of a member do not occur. The insertion groove 4 is formed with a predetermined depth from the outside and has the top surface 41 inclined in such a manner that the distance between the engine body 6 and the resin cover 1 decreases toward the interior. Therefore, when the wedge-shaped tool 8 is inserted into the insertion groove 4 in a direction substantially parallel to the mating surface, a force can be made to act in a direction along which the resin cover 1 is separated and removed from the engine body 6.

Figure 7:
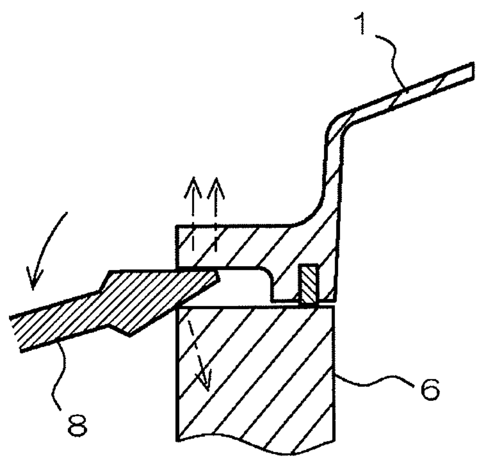
FIG. 7 is a partial sectional view showing a conventional example in which a tool is inserted into a gap between an engine body and a resin cover.
Figure 8:
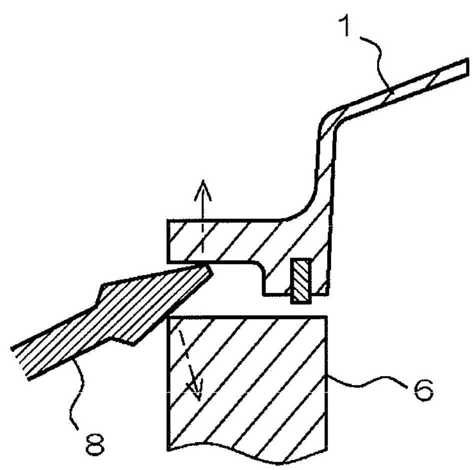
FIG. 8 is a partial sectional view showing a state in which a gap is opened by a tool in the conventional example shown in FIG. 7.

Conventionally, as shown in FIGS. 7 and 8, the tool 8 is inserted into a gap between the engine body 6 and the resin cover 1, so that the gap is widened to remove the resin cover 1. Thus, the resin cover 1 may be scratched or deformed by, for example, the tip of the tool 8.

With the resin cover 1 provided with the insertion groove 4 and its removal structure as described above, the resin cover 1 can be removed without using a special tool, and thus damage and deformation of the resin cover 1 during removal can be prevented.

In particular, a resin chain cover provided across a plurality of components, which form the engine body 6, so as to cover a chain bridged from a crankshaft of a crankcase to a camshaft of a cylinder head on a side surface of the engine body 6 is firmly fixed to the engine body 6 to secure sealing property. Therefore, heretofore it has not been easy to remove the resin chain cover. The resin cover removal structure provided with the insertion groove 4 can make it extremely easy to remove such a resin chain cover.

The present invention is not limited to the embodiments described in detail above, and various modifications or changes can be made within the scope set forth in the claims of the present invention.

What is claimed is:

1. A resin cover removal structure for removing a resin cover attached to a metallic engine body, wherein the engine body and the resin cover are attached to each other in such a manner that a body-side attachment surface formed on a peripheral edge portion of the engine body and a cover-side attachment surface formed on a peripheral edge portion of the resin cover face each other, a part of at least one of the body-side attachment surface and the cover-side attachment surface is cut off to provide an insertion groove opened outside a peripheral edge portion of the part, the insertion groove is inclined in such a manner that a distance between the engine body and the resin cover decreases toward the inside of the peripheral edge portion, and the resin cover is removable from the engine body by inserting a wedge-shaped tool into the insertion groove.

2. The resin cover removal structure according to claim 1, wherein the tool is thinned toward a tip at an inclination angle equal to or greater than the inclination of the insertion groove, and the tool is inserted into the insertion groove in a direction parallel to the body-side attachment surface to separate the resin cover from the engine body.

3. The resin cover removal structure according to claim 2, wherein a gasket is provided on the interior side from the insertion groove.

4. The resin cover removal structure according to claim 2, wherein the insertion groove is provided on the cover-side attachment surface.

5. The resin cover removal structure according to claim 4, wherein a gasket is provided on the interior side from the insertion groove.

6. The resin cover removal structure according to claim 1, wherein the insertion groove is provided on the cover-side attachment surface.

7. The resin cover removal structure according to claim 6, wherein a gasket is provided on the interior side from the insertion groove.

8. The resin cover removal structure according to claim 6, wherein the resin cover comprises the insertion groove.

9. The resin cover removal structure according to claim 1, wherein a gasket is provided on the interior side from the insertion groove.

10. The resin cover removal structure according to claim 1, wherein the resin cover is a cylinder head cover or a chain cover.

* * * * *